UNITED STATES PATENT OFFICE.

CHARLES F. DILLER, OF LANCASTER, PENNSYLVANIA.

SOIL AND SEED INOCULATION.

1,354,808.     Specification of Letters Patent.     Patented Oct. 5, 1920.

No Drawing.     Application filed October 29, 1919. Serial No. 334,343.

*To all whom it may concern:*

Be it known that I, CHARLES F. DILLER, a citizen of the United States, residing in Lancaster, Lancaster county, State of Pennsylvania, have invented new and useful Improvements in Soil and Seed Inoculation.

The invention relates to the process of culturing, of suspending and of preserving bacterial organisms—hereinafter called soil organisms—for specialized and specific purposes herewith mentioned, and described in detail, and made a part of the claims of this patent.

The invention has for its object three features:—

(1) *The culture of soil organisms.*

Soil organisms are now taken from the soil, plants and seeds, and are prepared for soil and seed inoculation by the method of using nutrient gelatin, agar, sodium-silicate, and even other organic matter. Beijerinck, Winegradsky, Buchanan, Jordan, Kellermann and others have demonstrated that the presence of organic matter inhibits the growth of soil organisms, and that earth salts improve the nutrient gelatin media.

During five years of experiment in vegetating soil organisms as outlined by the authorities above referred to I have obtained many good cultures in the laboratory, and often improved plant growths when these cultures were applied to the soil and to seeds. Frequently, however, the results were negative, and the experiments a failure. I have discovered that the process herewith disclosed eliminates negative results, and makes only positive and effective culture.

Soil organisms may be taken from the soil, plants or seeds, or they may be taken from the soil and seed cultures now on the market,—provided, however, that they be thoroughly filtered, and all nutrient gelatin, agar, and especially that all organic matter be removed. It is then incubated, by the most approved incubator practice, in pure water, to which has been added stimulating inorganic salt of ammonia, potassium, phosphorus or sodium, either separately, or in combination, and in proportion of about .005%.

A temperature of 38 degrees centigrade is maintained until a high-power microscope shows not only the organisms desired, but also that they are in their best state of vegetation. Either a positive or a negative culture may be expected in 30 hours. If it is positive the culture is immediately absorbed, as hereinafter described.

If the culture is negative, it is destroyed.

A covered, permanent microscopic slide is then made (and microphoto-prints taken, if desired.)

(2) *The suspension of soil organisms.*

Soil and seed inoculations are now sold in liquid form, and "are not more in general use on account of the lack of requisite skill in application."—(*Jordan Bacteriology.*)

It is the purpose of this invention to make soil and seed inoculation universal by a product requiring no more skill than is possessed by the agronomist of ordinary ability.

Positive, tested culture, as above described, is quickly absorbed by previously dried and pulverized inorganic solid, such as silica, potassium-silicate, calcium-carbonate or phosphate-rock, and in proportion of 25 cubic centimeters of liquid to 100 grams of solid.

(3) *The preservation for future use of soil organisms.*

Soil and seed inoculation is "attended with much uncertainty" (Bac.) because the culture now on the market is sold in liquid or vegetative form, and consequently its virulence is very unstable and uncertain.

Soil organisms in suspension, as above described, are at once sieved and evaporated to the same dryness as was the absorbent solid before being used as above detailed. Drying preserves the product.

An experimental soil and seed culture that was made four years ago, as herewith described, and was kept in a dry, unheated shed and not hermetically sealed, is now of very positive effectiveness, and can be seen to-day in growing demonstration, and has also been tested by incubation. Whether soil and seed culture preserved as described would not keep indefinitely can be only a matter of further investigation and demonstration.

When soil and seed culture made as described is applied to seeds that have been moistened preparatory to being planted the culture is found to be very sticky, and it adheres very tenaciously to the seeds, and forms a positive culture.

What I claim as new and desire to secure by Letters Patent is:—

1. The process which comprises selecting soil organisms, freeing them from organic nutrients, and culturing them in water containing a small amount of an inorganic, stimulating salt.

2. The process of suspending soil organisms which comprises the absorption of the liquid resulting from the process set forth in claim 1, in a dry subdivided inorganic solid.

3. The process of preserving soil organisms which consists in evaporating off the water of suspension from the product resulting from the process set forth in claim 2.

In testimony thereof I have signed my name in the presence of two subscribing witnesses.

Signed at Lancaster, in the county of Lancaster, and State of Pennsylvania, this 28th day of October, 1919.

CHARLES F. DILLER.

Witnesses:
I. C. ARNOLD,
JOHN I. HAGER, Jr.